United States Patent [19]

Hamano et al.

[11] Patent Number: 4,838,125
[45] Date of Patent: Jun. 13, 1989

[54] SYSTEM FOR SHIFT CONTROL IN AUTOMATIC TRANSMISSION

[75] Inventors: Yukio Hamano, Kobe; Hideo Tomomatsu, Nagoya; Fumiaki Izumi, Toyota; Yutaka Taga, Aichi, all of Japan

[73] Assignee: Toyota Jidosha Kabushiki Kaisha, Aichi, Japan

[21] Appl. No.: 12,136

[22] Filed: Feb. 6, 1987

[30] Foreign Application Priority Data

| Feb. 7, 1986 | [JP] | Japan | 61-25433 |
| Feb. 10, 1986 | [JP] | Japan | 61-27380 |
| Apr. 18, 1986 | [JP] | Japan | 61-89248 |

[51] Int. Cl.$^4$ ............................................. B60K 41/18
[52] U.S. Cl. ..................................... 74/866; 364/424.1
[58] Field of Search ................. 74/866, 867, 856, 859, 74/863, 864; 364/424.1

[56] References Cited

U.S. PATENT DOCUMENTS

| 4,350,057 | 9/1982 | Kishi et al. | 74/866 |
| 4,373,619 | 2/1983 | Schritt et al. | 74/866 X |
| 4,393,732 | 7/1983 | Suzuki et al. | 74/866 |
| 4,414,863 | 11/1983 | Heino | 74/866 X |
| 4,495,457 | 1/1985 | Stahl | 74/866 X |
| 4,523,281 | 6/1985 | Noda et al. | 74/866 X |
| 4,583,171 | 4/1986 | Hara et al. | 74/866 X |
| 4,584,906 | 4/1986 | Nagaoka et al. | 74/866 |
| 4,628,772 | 12/1986 | Nishikawa et al. | 74/866 |
| 4,635,508 | 1/1987 | Tatsumi | 74/866 |
| 4,653,350 | 3/1987 | Downs et al. | 74/866 X |

FOREIGN PATENT DOCUMENTS 1780693 5/1975 Fed. Rep. of Germany ........ 74/867

Primary Examiner—Dirk Wright
Attorney, Agent, or Firm—Oliff & Berridge

[57] ABSTRACT

In a system for shift control in an automatic transmission, wherein gear stages are automatically switched in accordance with a preset shift pattern, judgment is made as to whether or not a shifting was abnormal, and, if it is judged as abnormal, the shift pattern in the subsequent shifting is changed to a fail shift pattern, in which shift points are set slightly low. With this arrangement, the durability of frictionally engaging devices is secured.

26 Claims, 15 Drawing Sheets

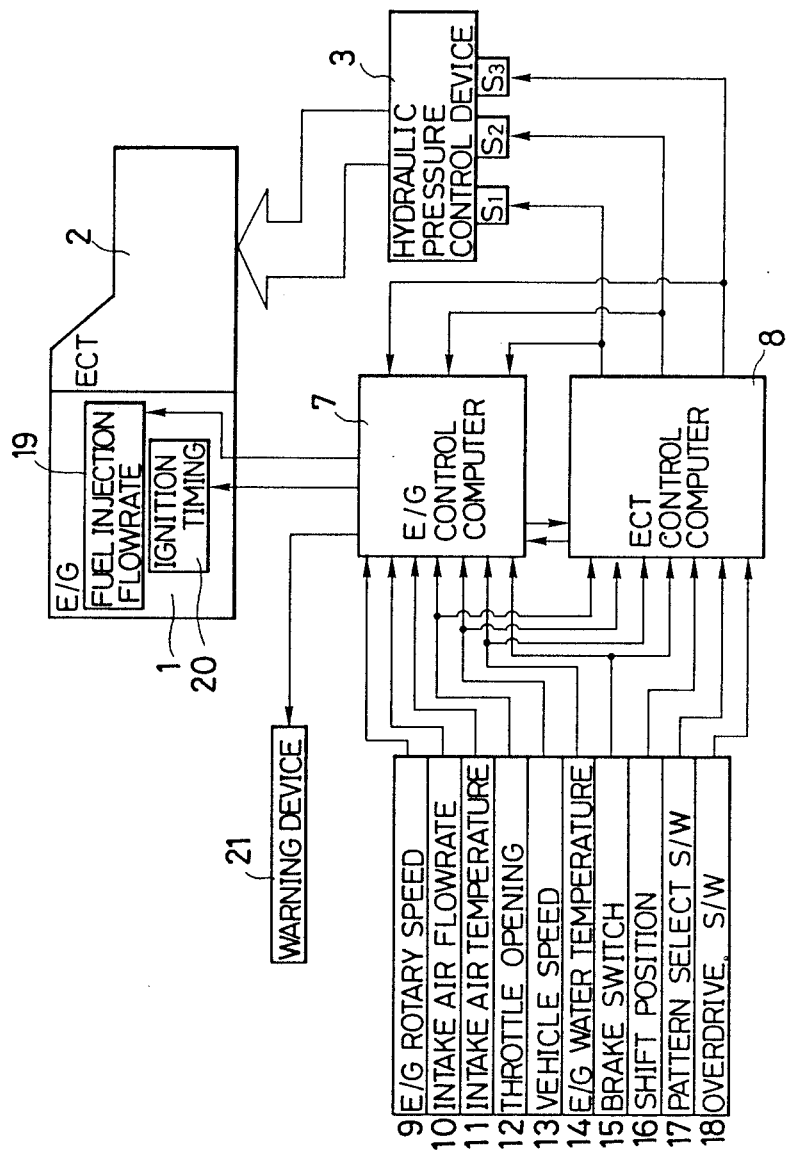

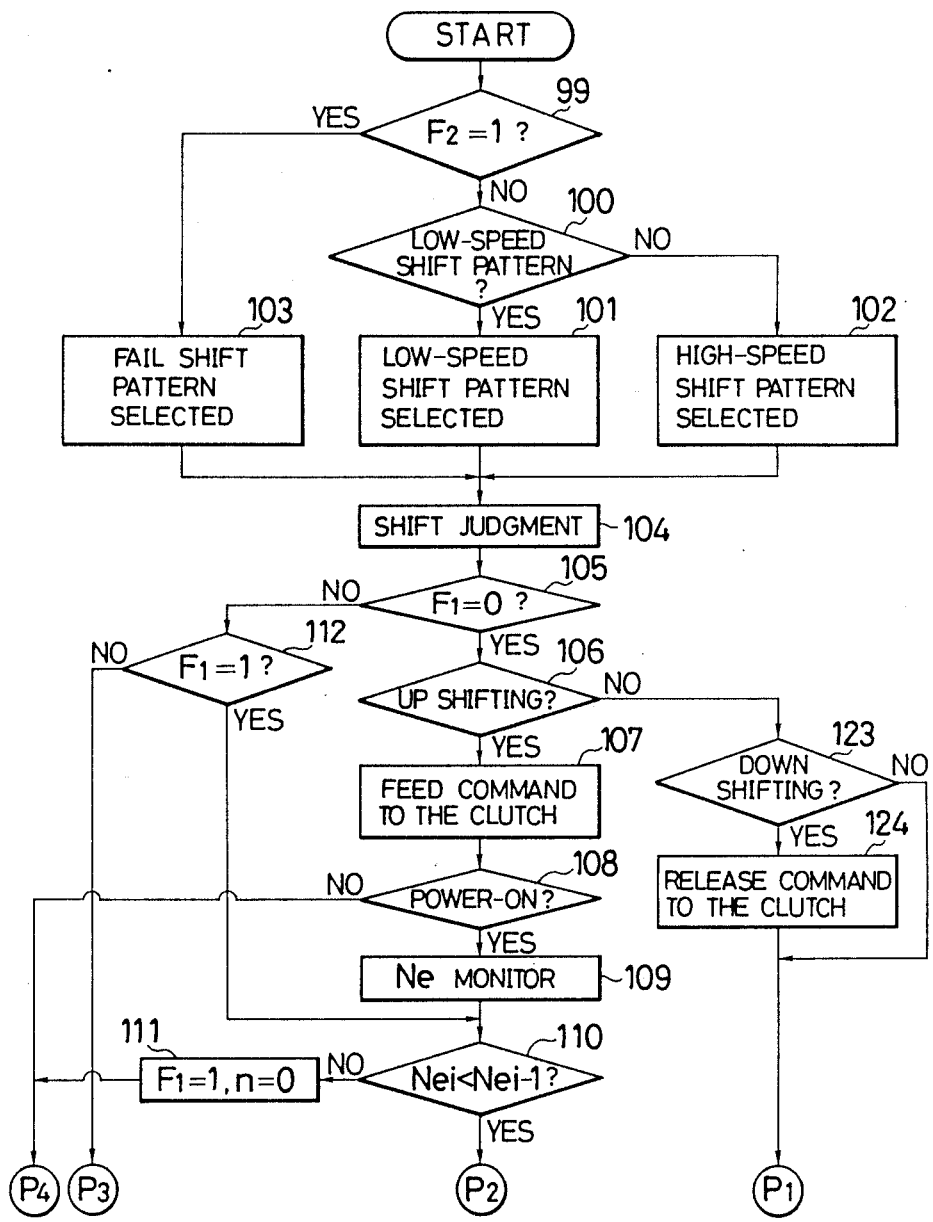

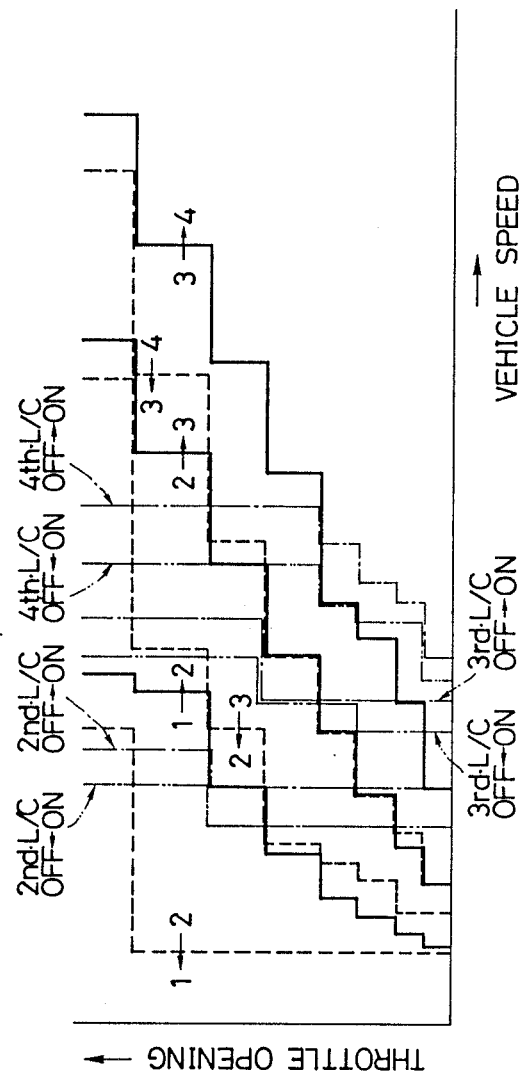

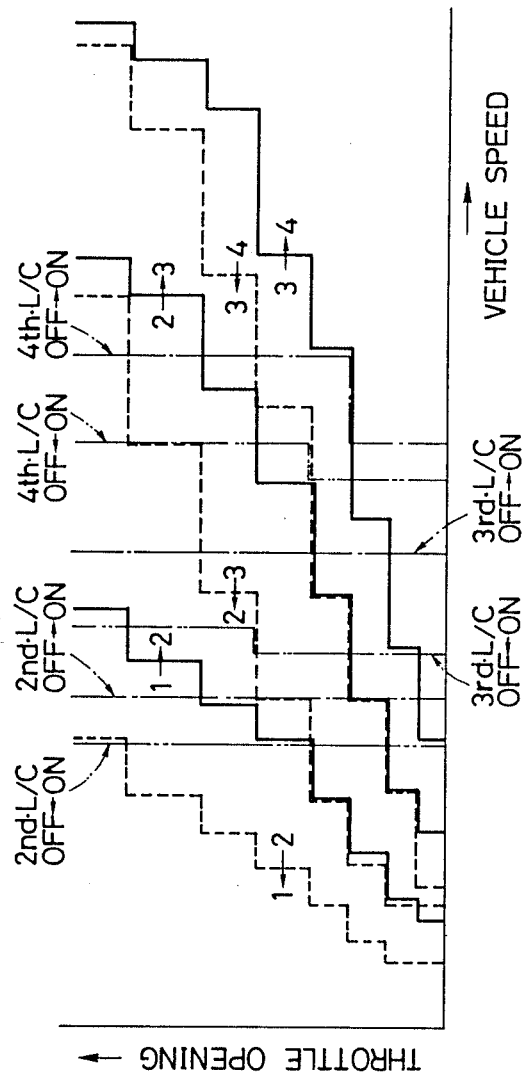

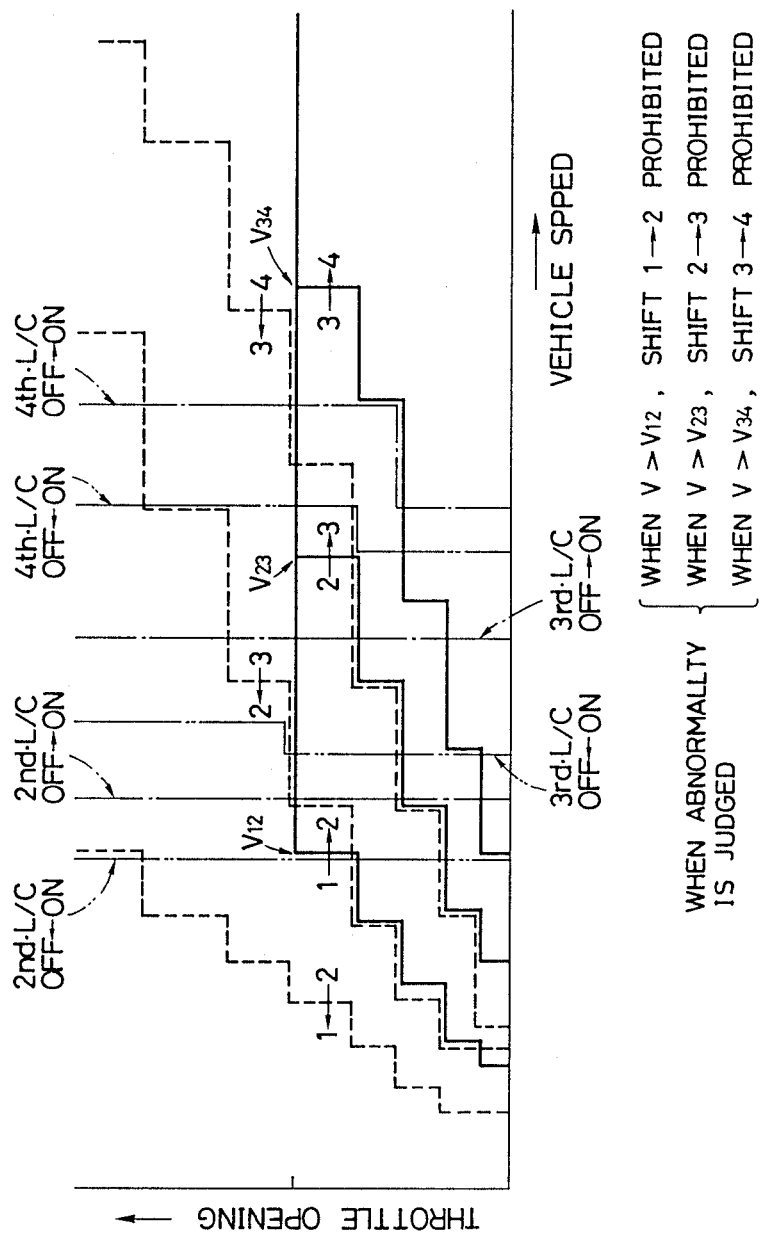

SYSTEM FOR SHIFT CONTROL IN AUTOMATIC TRANSMISSION

BACKGROUND OF THE INVENTION

1. Field of the Invention

This invention relates to a system for shift control in automatic transmission. More particularly it relates to improvements in a system for shift control in automatic transmission and an engine, wherein gear stages are automatically switched in accordance with a preset shift map.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map, are well known in the transmission art.

Furthermore, in an automatic transmission for a vehicle, of the type described, various systems are known for integrally controlling an automatic transmission and an engine, wherein, engine torque is changed during shifting to obtain satisfactory shift characteristics and durability of the frictionally engaging devices (For example, Japanese Patent Laid-Open No. 69738/1980). More specifically, the system for integrally controlling the automatic transmission and the engine, of the type described changes the amount of torque transmitted from the engine during shifting and controls the amount of energy absorbed by various members in the automatic transmission or by the frictionally engaging devices so as to complete a shifting within a short period of time under a low shift shock, whereby a satisfactory shift feeling is given to a driver and durability of the frictionally engaging devices is improved.

However, when the control for changing engine torque cannot be carried out due to trouble in a sensor system or a request from the engine side, durability of the frictionally engaging devices is reduced due to an increase in the amount of absorbed energy by the frictionally engaging devices in the automatic transmission. Moreover, a shifting time duration is prolonged therefore worsening the shift feeling. This is caused by the shift tuning data (oil pressure and the like) in the automatic transmission set in expectation of a decrease in the engine torque by a predetermined value during the shifting.

Furthermore, no matter whether the engine torque change control during shifting as described above may be carried out or not, even when the working oil pressure is decreased due to the oil leakage for example, the shift time duration is prolonged to affect less durability of the frictionally engaging devices, and the shifting is not completed in a shockless region of the accumulator, whereby high shift shocks occur.

SUMMARY OF THE INVENTION

The present invention has been developed to obviate the above-described disadvantages of the prior art and has as its object the provision of a shift control system in an automatic transmission, wherein, when an abnormal shifting is performed (or to be performed) for some reason or other, the abnormal shifting is quickly detected, so that the durability of the frictionally engaging devices in the automatic transmission can be secured, and satisfactory shift characteristics can be secured.

According to the first aspect of the present invention, judgment is made as to whether or not the current shifting has been abnormal. When it is judged that the current shifting has been abnormal, the shift pattern for the subsequent shifting is changed to a fail shift pattern wherein the shift point is set slightly low for the special use in an abnormal time.

More specifically, according to the first aspect of the present invention, an abnormal shifting is quickly detected for example, in the case where an abnormal shifting actually occurs with no engine torque change control being carried out for some reason such as a trouble in the sensor system or a request from the engine, where an engine torque change control should be carried out, or, in the case where an abnormal shifting occurs for some reason such as wear-out of the frictionally engaging devices, a decrease in the working oil pressure etc. When an abnormal shifting is detected, a shift pattern for the subsequent shifting is changed to a fail shift pattern wherein the shift point is set slightly lower for the special use in an abnormal time. As a consequence, the subsequent shifting is performed slightly early (is performed where the vehicle speed is low, i.e. an inertia torque of the engine is low). Accordingly, the energy applied to the frictionally engaging devices becomes low, so that the durability of the frictionally engaging devices can be improved. Further, the shift time duration can be included within the shockless region of the accumulator, so that the shift characteristics can be presented from being deteriorated.

Additionally, there has been widely known such a shift control system that two or more shift patterns are provided, which include shift points taking a serious view of the power performance (generally referred to as a P pattern) and a serious view of the fuel consumption (generally referred to as an E pattern), and a driver can select either the former or the latter optionally by the pattern select switch. However, there has heretofore been no disclosure of utilizing another shift pattern as a measure to be taken when an abnormal shifting occurs.

On the other hand, according to a second aspect of the present invention, an abnormal shifting is quickly detected similarly to the first aspect in the case where an abnormal shifting actually occurs with no engine torque change control being carried out for some reason such as a trouble in the sensor system or a request from the engine, where an engine torque change control should be carried out, or, in the case where an abnormal shifting occurs for some reason such as wear-out of the frictionally engaging devices, and a decrease in the working oil pressure etc. When an abnormality is detected, the performing region of the subsequent upshift is restricted. As a consequence, for example, when the engine load is higher than a predetermined value or the vehicle speed is higher than a predetermined value, a predetermined upshift is prohibited, so that the frictionlly engaging devices can avoid being placed under the severe state. Furthermore, since the shifting is restricted, high shift shocks should naturally be avoided. Additionally, since such a problem as described above is not caused to a downshift in general, the downshift is not restricted.

According to the first and second aspects of the present invention, a preferred embodiment is of such an arrangement that means for judging the abnormality is the means which monitors an engine rotary speed and judges whether a time duration, during which the engine rotary speed changes, is inappropriate or not in comparison with a preset value.

According to the first and second aspects of the present invention, another preferred embodiment is of such an arrangement that means for judging the abnormality is the means which monitors an output shaft torque of the automatic transmission and judges whether a time duration, during which the output shaft torque changes from the minimum value to the maximum value is inappropriate or not in comparison with a preset value.

According to the first and second aspects of the present invention, a further preferred embodiment is of such an arrangement that means for judging the abnormality is the means which monitors an output shaft torque of the automatic transmission and judges whether the maximum value or the minimum value of the output shaft torque is inappropriate or not incomparison with a preset value.

As described above, according to the first and second aspects of the present invention, the means for judging the abnormality need not necessarily be limited. Additionally, in this case, it would be better if the preset value in each of the means is changed in accordance with the engine load, the type of shifting and the like.

According to the first and second aspects of the present invention, a still further preferred embodiment is of such an arrangement that, when the shift pattern is change or the performing region of upshift is restricted, a warning is issued. With this arrangement, the driver is quickly informed that an abnormal shifting has occurred for some reason or other and that, therefore, a running under a special shift control is currently carried out.

According to the first aspect of the present invention, a preferred embodiment is of such an arrangement that a change to the fail shift pattern is performed only when the engine load is higher than a predetermined value. The advantages obtained with this arrangement will be described hereunder. Namely, when the engine load is low, the durability of the frictionally engaging devices does not matter in general, and the shifting is completed relatively quickly. As a consequence, when the engine load is high to a certain extent, the present invention comes to be particularly effective. Because of this, even if the forced change of the shift pattern is performed only when the engine load is higher than the predetermined value, there is little trouble. Preferably, when the engine load is less than the predetermined value, it becomes possible to run under the normal shift pattern, within which the power performance is secured.

According to the first aspect of the present invention, another preferred embodiment is of such an arrangement that a change to the fail shift pattern is performed only for the shifting which has had an abnormality. With this arrangement, with a shifting having no problem, the running can be performed under the normal shift pattern, within which the power performance is secured.

According to the first aspect of the present invention, a further preferred embodiment is of such an arrangement that, when an engine torque lowering control which should be performed during shifting is not carried out, the fail shift pattern is formed of a shift point previously searched so that an absorbed energy value in the fricitonally engaging devices can be less than a tolerance value.

With this arrangement, even when the engine torque change control during shifting is not carried out for some reason or other, the durability of the frictionally engaging devices is not harmed therefore, and it becomes possible to perform a shifting having a low shift shock. Additionally, the absorbed energy E of the frictionally engaging devices can be determined in accordance with the following formula.

$$E = A \cdot No \cdot ts \cdot Tt + B \cdot No$$

where
E: absorbed energy in the frictionally engaging devices;
A: a constant determined in association with the gear ratio;
No: a rotary speed of the output shaft of the automatic transmission;
ts: a shift time duration;
Tt: a turbine torque (nearly equal to an engine torque in a high throttle); and
B: a constant determined in association with a gear ratio and the inertial moment of each of the members.

As apparent from the above furmula, the lower the shift point (the smaller the No) is, the less the absorbed energy in the fricitonally devices becomes.

According to the first aspect of the present invention, a still further preferred embodiment is of such an arrangement that two or more fail shift patterns are provided and one of these fail shift patterns is selected in accordance with the state of selection of the pattern select switch. With this arrangement, even when an abnormal shifting is detected, the running, to which the intention of the driver is respected to some extent, can be performed.

According to the first aspect of the present invention, a still more further preferred embodiment is of such an arrangement that, in the fail shift pattern, shift points for down shift are set still lower than shift points for upshift as compared with the normal balancing. With this arrangement, the shift frequencies, particularly, the upshift frequencies can be decreased in number, so that the load acting on the frictionally engaging devices can be reduced accordingly.

According to the first aspect of the present invention, a yet further preferred embodiment is of such an arrangement that the fail shift pattern is made identical with a shift pattern, in which the shift point is set slightly low, out of the shift patterns provided in plural number. With this arrangement, a predetermined effect according to the present invention can be achieved with a highly simplified construction without increasing a ROM capacity and the like of the computer.

According to the second aspect of the present invention, a preferred embodiment is of such an arrangement that the performing region of the upshift is restricted in association with the engine load. The advantages obtained with this arrangement will be described hereunder. Namely, as described above, when the engine load is low, the durability of the frictionally engaging devices does not matter and the shift shock is relatively low. As a consequence, when the engine load is high to a certain extent, the present invention comes to be particularly effective. From the above-described viewpoint, it is desirable that restriction of the upshift according to the second aspect of the present invention is carried out in association with the engine load.

According to the second aspect of the present invention, another preferred embodiment is of such an arrangement that the performing region of the upshift is restricted in association with the vehicle speed. From the viewpoint similar to the above, restriction of the upshift according to the second aspect of the present invention can be performed in association with the vehicle speed. However, in this case, it is desirable that the value of the vehicle speed for performing this restriction is changed in accordance with the type or shifting.

According to the second aspect of the present invention, a further preferred embodiment is of such an arrangement that, even when the performing region of the upshift is restricted, the downshift is carried out in the same manner as in the normal time. In the case described above, when restriction of the performing region of the upshift is carried out in association with the engine load for example, if the engine load is less than a predetermined value, i.e. the accelerator is not depressed very much, then both the upshift and the downshift can be carried out entirely similar to those in the normal time, and moreover, when an emergency acceleration is needed during running, a so-called kickdown can be normally carried out.

BRIEF DESCRIPTION OF THE DRAWINGS

The above object, features and advantages of the present invention, as well as other objects and advantages thereof, will become more apparent from the description of the invention which follows, taken into conjunction with the accompanying drawings, wherein like reference characters designate the same or similar parts and wherein:

FIG. 1 is a general block diagram of the automatic transmission and the engine, showing an embodiment of the present invention;

FIGS. 2(A) to 2(B) are flow charts showing a control routine adopted in the shift control system of the above embodiment;

FIG. 11 is a chart showing examples of the shift patterns.

DESCRIPTION OF THE PREFERRED EMBODIMENTS

Figure 2B:
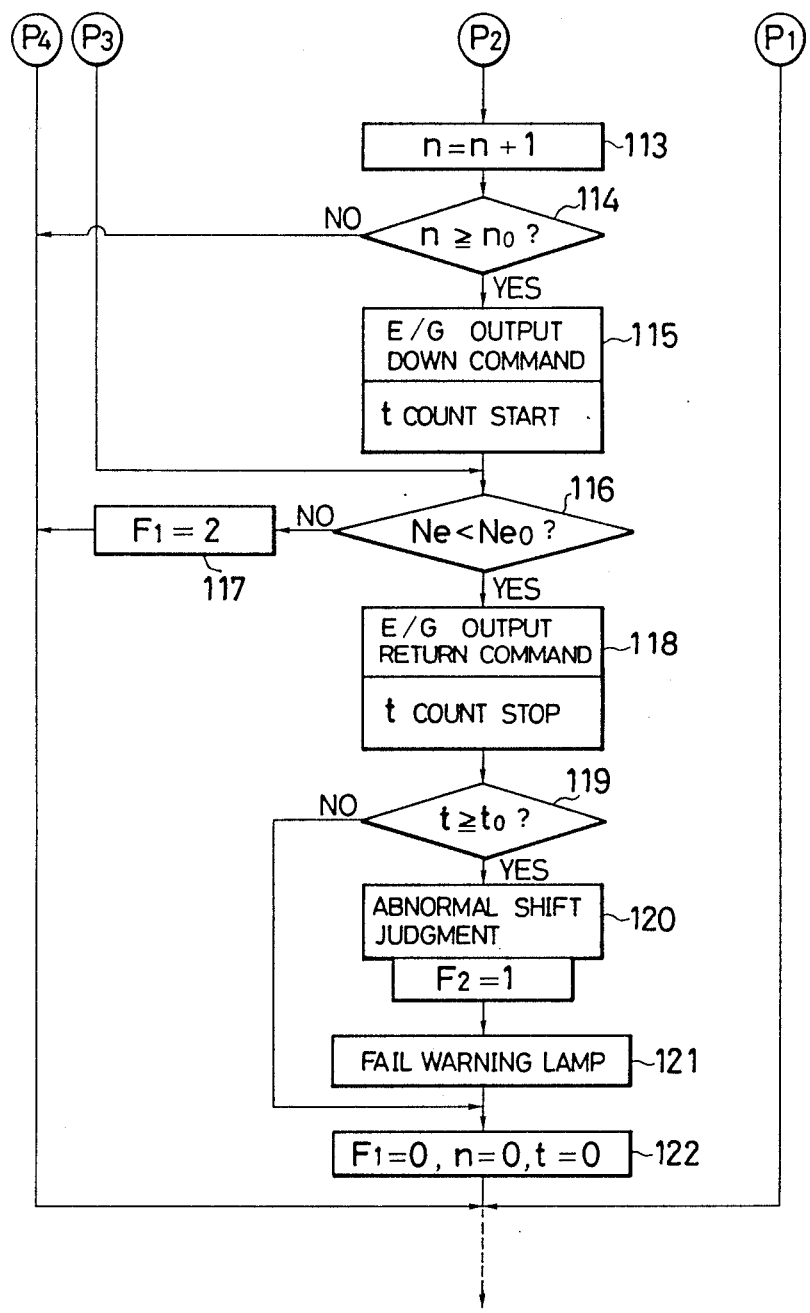

The present invention will be described in detail with reference to the accompanying drawings which illustrate preferred embodiments of the present invention.

FIG. 1 is a block diagram showing the general arrangement of the system for integrally controlling an automatic transmission and an engine, to which the present invention is applied.

An engine 1 and an automatic transmission 2 are well known in the art. Relating to FIGS. 1 and 2 in the engine 1, fuel injection flowrate at an injector 19 and an ignition timing at a distributor 20 are controlled by an engine control computer 7, so that engine output in proportion to accelerator opening and engine rotary speed can be obtained. In the automatic transmission (hereinafter referred to as "ECT") 2, electromagnetic valves S1–S3 are controlled by an automatic transmission control computer (hereinafter referred to as "ECT control computer"), and oil lines in a hydraulic pressure control device 3 are controlled whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from a output shaft speed sensor 13; engine water temperature from a water temperature sensor 14; and brake-ON signal from a brake switch 15. The engine control computer 7 determines the fuel injection flowrate and the ignition timing in response to the above-mentioned signals. Furthermore, ON-OFF solenoid signals of the electromagnetic valves S1–S3 controlled by the ECT control computer 8 are parallelly inputted into engine control computer 7, whereby shift timing of the automatic transmission is determined.

ECT control computer 8 receives signals from the throttle sensor 12; the vehicle speed sensor 13; the water temperature sensor 14; the brake switch 15, and further, signals of: position of a shift lever from a shift position sensor 16; running selection pattern such as a fuel consumption mode and a power performance mode from a pattern select switch 17; permission of a shift to overdrive from an overdrive switch 18; and the like, whereby the ON-OFF states of electromagnetic valves S1–S3 are controlled, so that a gear stage proportioned to the vehicle speed and the accelerator opening can be obtained.

FIG. 2 is the flow chart showing the integral control of the engine and the automatic transmission.

In this embodiment, an engine rotary speed Ne is monitored and a dime duration, during which the engine rotary speed Ne is lowered, is detected to thereby judge an abnormal shifting.

Respective Steps will hereunder be described. Step 99: judgment is made as to whether flag F2 is 1 or not. This flag F2 becomes 1 when it is judged that an abnormal shifting is judged to be present in Step 120. When F2=1, i.e. the abnormal shifting actually occurred, the routine preceeds to Step 103, so that the fail shift pattern can be set regardless of the position of a pattern select swtich 17.

Figure 3:
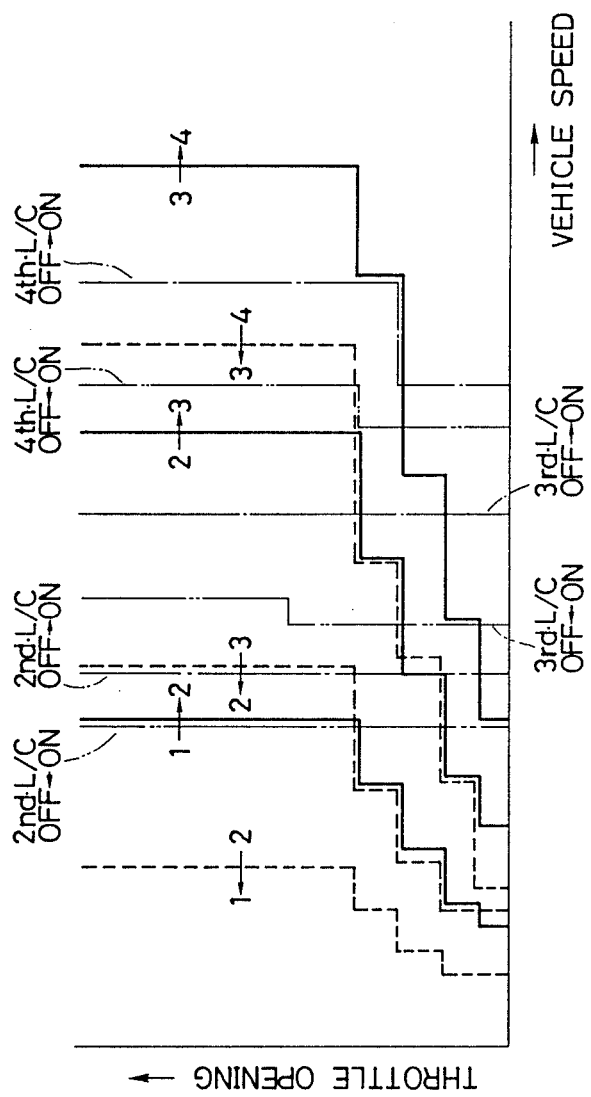
FIG. 3(A) to 3(D) are charts showing the examples of shift patterns.
Figure 3:
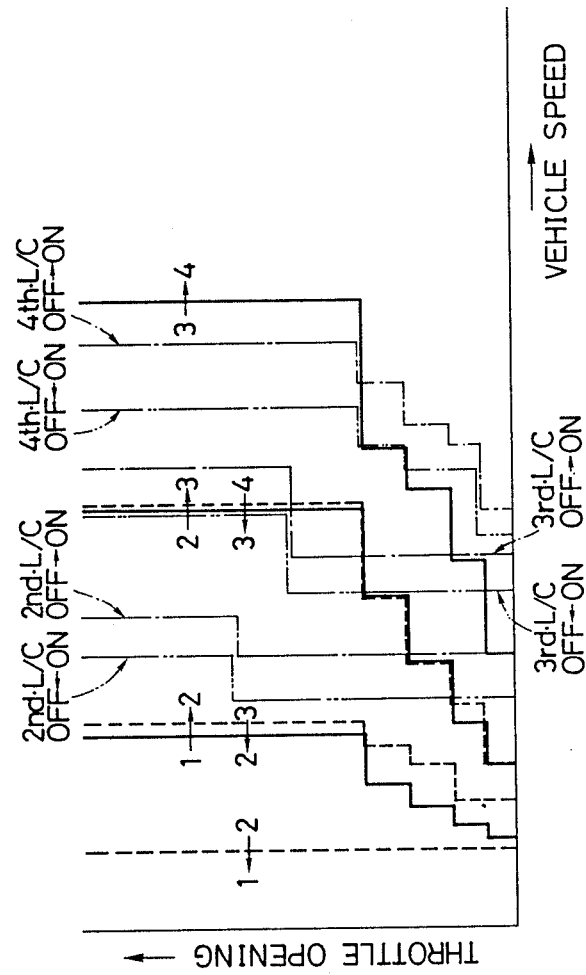

Step 100: judgment is made by the pattern select switch 17 as to whether or not a low-speed shift pattern (Refer to FIG. 3(A)) for shifting within a low rotary region of the engine 1 is selected.

Step 101: when Step 100 is "YES", the low-speed shift pattern is set as selected by the pattern select switch 17.

Step 102: when the low-speed shift pattern is not selected and flag F2 is not 1, a high-speed shift pattern (FIG. 3(B)) is set.

Step 103: when it is judged that flag F2=1 in Step 99, a fail shift pattern (Refer to FIG. 3(C)) is set. In this fail shift pattern, the shift points thereof are set further lower than that in the low-speed shift pattern so that no trouble occurs in the frictionally engaging devices even if the engine torque change control during shifting is not performed.

Step 104: a shift judgment is made in accordance with a shift pattern set in each of Steps 101, 102 or 103.

Step 105: judgment is made as to whether or not flag F1 is zero. Flag F1 is initially set at zero, set at 1 in Step 111, and set at 2 in Step 117, respectively. When flag F1 is set at zero, the routine proceeds to Step 106.

Step 106: judgment is made as to whether or not an upshift judgment is made.

Step 107: a command (a shift command) is given to electromagnetic valves S1–S3 to supply oil pressure to the frictionally engaging devices, corresponding thereto.

Step 108: judgment is made as to whether or not power-ON (engine output is positive, i.e. engine brake is not acting).

Step 109: the engine rotary speed Ne is monitored to detect an actual shift starting time in response to an upshift command.

Step 110: judgment is made as to whether or not the detected engine rotary speed Nei is lower than the preceding detected value Nei-1. Namely, judgment is made as to whether or not the engine rotary speed Ne has begun to be lowered by the upshift command. In this case, even if the oil pressure feed to the frictionally engaging devices for the upshift is started in Step 107, normally, the shifting is not immediately started. Accordingly, in Step 110 the routine initially indicates "NO", and preceeds to Step 111.

Step 111: after an oil pressure feed command for the upshift is issued, in order to indicate the start of monitoring of the engine rotary speed Ne, flag F1 is set at 1, and a number n of establishments of Nel<Nei−1 is set at zero.

Step 113: when Nei<Nei−1 is established in Step 110, 1 is added to the number n of the establishments.

Step 114: judgment is made as to whether the number n of continuous establishements of Nei<Nei−1 is equal to or more than a predetemined value nO (nO=3, for example) or not. When the result of judgment is "YES", it is descriminated that the lowered engine rotary speed is not a temporary one in the fluctuations of rotation and is the lowered rotation (change) in response to the upshift command. As a result, the actual shift start is recognized and the routine preceeds to Step 115.

Step 115: an engine output down command is outputted, and simultaneously, a timer is started to measure a shift time duration t.

Step 116; Ne being monitored is compared with NeO which is set to be slightly higher than a calculated value corresponding to a typical Ne value after shifting. When not Ne<NeO, it is judged that the shifting is still underway (engine output down), and the routine proceeds to Step 117. When Ne<NeO is extablished, it is judged that it is immediately before the completion of the shifting, and the routine proceeds to Step 118.

Step 117: in order to indicate that the shifting is still underway, flag F1 is set at 2.

Step 112: since it was judged that F1≠0 in Step 105, judgment is made as to whether or not F1=1 in this Step. When F1=1, the routine proceeds to Step 110 to judge whether or not a shifting is started. When F1≠1, i.e. F1=2, the routine proceeds to Step 116 to judge whether or not the shifting is completed.

Step 118: since it is immediately before the completion of the shifting, a command to restore the engine output is outputted and the timer for measuring the shift time duration t is stopped.

Step 119: the shift time duration t is compared with an abnormal shift discriminating time duration t0 preset in accordance with the type of shifting, the throttle opening and the shift point. When t≦t0, the routine proceeds to Step 120.

Step 120: it is judged that an abnormal shifting is carried out, and flag F2 is set at 1. When F2=1, switching is forcedly made to a fail shift pattern wherein the shift point is set slightly lower in order to reduce the absorbed value of energy of the frictionally engaging devices, regardless of the position of the pattern select switch 17 (Refer to Steps 99 and 103).

Step 121: a warning lamp is displayed to inform the driver of that the shift pattern is fixed at the fail shift pattern regardless of the position of the pattern select swtich 17 in order to protect the frictionally engaging devices because the abnormal shifting was carried out.

Step 122: flag F1, the number n of establishments of Nei<Nei−1 and the shift time duration measured value t are all set to zero.

Step 123: judgment is made as to whether or not the downshift judgment is made. When the judgment is "YES", the routine proceeds to Step 124.

Step 124: an oil pressure release command is issued to the corresponding clutch.

Additionally, reset of flag F2 is not illustrated in the flow chart, however, flag F2 should not be reset unless the cause of the abnormal shifting is obviated, accordingly, flag F2 may be reset when the battery terminal is released.

Figure 4:
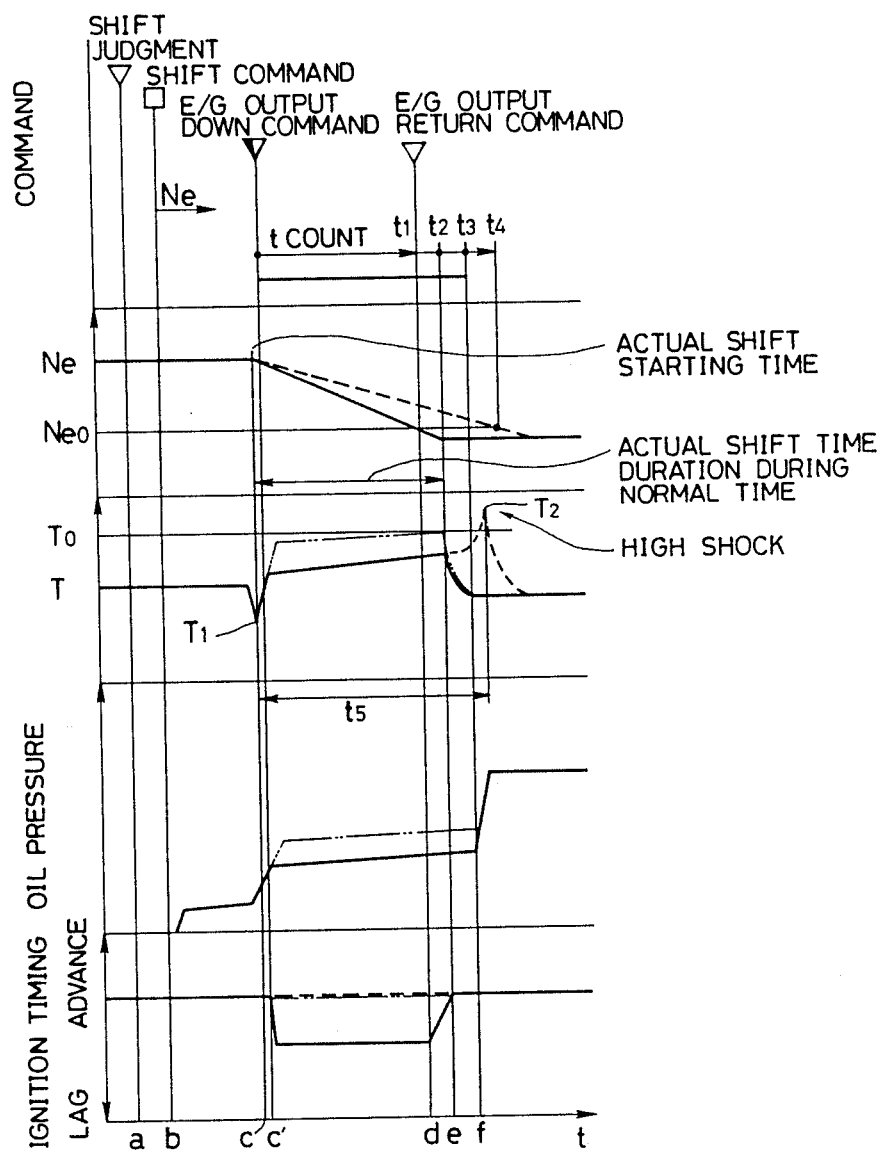
FIG. 4 is a shift transitional characteristics chart when the above control routine is carried out.

FIG. 4 shows the shift transitional characteristics when the above-described control flow is carried out.

A shift command "b" is carried out after a lapse of a predetermined period of time upon issuance of a shift judgment "a" as in customary. This is a countermeasure to meet the case where so-called multi-speed shifts are performed.

An engine output down command is to be issured at a time "c'" after Nei<Nei−1 is continuously repeated n times, which is found by monitoring of the engine rotary speed Ne. The time "c'" is somewhat behind the actual time of shift starting.

When the engine output control is normal, the time of completion of shifting is t2, however, when the measured value in the above-described flow is t1, the shift time duration is measured smaller than the actuality by t2−t1. Designated by t3 in the drawing is a stroke-end time (time of completion of a shockless region) of a piston of an accumulator provided on the frictionally engaging devices. Since the actual shift time duration should be completed before this stroke-end time, when the measurement of the shift time duration is used as the means for judging an abnormal shifting, at least the abnormal shift discriminating time duration t0 is set to a value smaller than t3. Furthermore, as described above, in the case where a technique of judging the shift completion time by NeO is adopted, the shift time duration t is measured smaller than the actuality by t2−t1. Accordingly, finally, the abnormal shift discriminating time duration t0 is set at a value of t0<t3−(t2−t1). Additionally, all of the time start points of t1−t3 are originated by an engine output down command "c'", and hence, a time lag (between "c−c'") which is produced initially has no connection thereto. The aforesaid t3 may be searched in design from the capacity op an accumulator, diameter of an orifice, line oil pressure or the like, or may be determined byt the empirical data. A measured value t4, when the engine output control is performed abnormally, becomes larger than t3−(t2−t1), with the result that it is judged as "YES" in Step 119.

In FIG. 4, in the case where the engine output control is performed normally (solid line), working oil pressure of the frictionally engaging devices is preset slightly low, as compared with the case where the engine output control is not carried out (two-dot chain line). Because of this, fluctuations in the output shaft torque T of the automatic transmission are low. In the case where the engine output control was not performed for some reason or other (broken line), the working oil pressure of the frictionally engaging devices is low against the load torque of the frictionally engaging devices, whereby a shift progress rate (a rate of change of the engine rotary speed Ne) becomes low, whereby the shift time duration t is prolonged to cover t4, so that very high shocks are produced after the stroke-end of the accumulator piston.

According to the above embodiment, this abnormality is detected by a time length of the shift time duration t and even if a shift pattern, wherein shift points are set slightly high, is selected by the pttern select switch, this shift pattern is forcedly changed to a shift pattern, wherein shift points are set slightly low, whereby shiftings are performed in a region, where the inertia torque of the engine is low, after the succeeding shifting, whereby the heat load of the frictionally engaging devices is reduced during shifting, so that the durability of the frictionally engaging devices can be improved, the shift time duration t is shortened and high shift shocks can be avoided.

Furthermore, in this case, the driver can be informed of an abnormality by the warning device, so that the feeling of abnormality due to the slight low shift point can be avoided and a cause of occurrence of a trouble can be quickly inspected.

Additionally, in the above embodiment, only one establishment of $t \leq t0$ makes it possible to judge an abnormal shifting so that an abnormal shifting cannot be easily judged within a range of scattering.

Furthermore, the change of the shift pattern may be limited to the shifting in which abnormality is caused.

Or, the change of the shift pattern may be made only in the case of a high throttle opening where the durability of the frictionally engaging devices matters.

Furthermore, in the above embodiment, in judging an abnormal shifting, the engine rotary speed is monitored to judge whether or not the time duration, during which the engine rotary speed is lowered, is longer than the preset value. However, the present invention need not necessarily be limited to this, and, for example, the output shaft torque T of the automatic transmission may be monitored to judge whether or not a time duration, during which the output shaft torque T changes from the minimum value T1 to the maximum value T2 (t5 in the shift characteristics diagram shown in FIG. 4) is longer than a preset value. Further, the output shaft torque T sof the automatic transmission may be monitored to judge whether or not the maximum value T2 (similarly to the above, refer to FIG. 4) is larger than a preset value T0.

Figure 5:
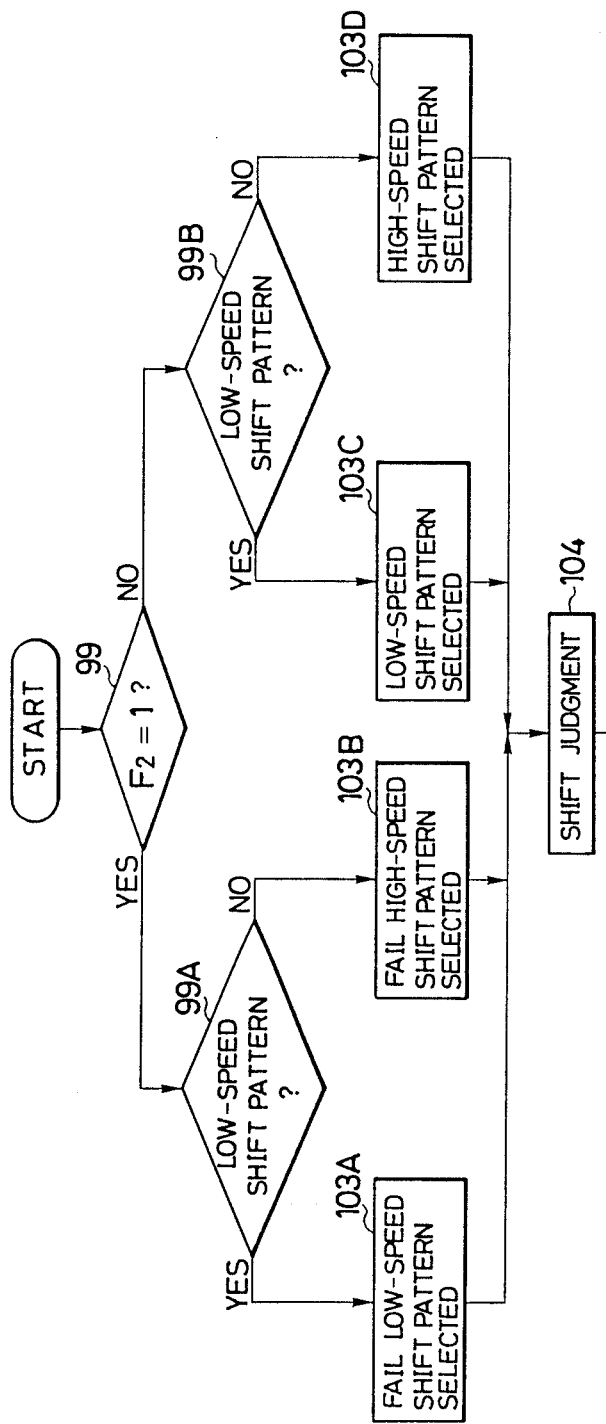
FIG. 5 is a flow chart showing the essential portions of a second embodiment of the present invention.

Further, in the above embodiment, when an abnormal shifting is detected in Step 103B, the shift pattern is changed to the fail shift pattern as shown in FIG. 3(C) regardless of that either the low-speed shift pattern or the high-speed shift pattern is selected by the pattern select switch 17. However, two types of the fail shift pattern may be provided, and when the abnormal shifting occurs, the position of the pattern select switch (intention of the driver) may be reflected. Namely, as shown in FIG. 5, when judgment of "YES" is made in Step 99, judgment is made as to whether or not the pattern select switch has selected the low-speed shift pattern in Step 99A. When the low-speed shift pattern has been selected, a fail low-speed shift pattern is selected in Step 103A, and, when the high-speed shift pattern is selected, a fail high-speed shift pattern is selected in Step 103B, respectively. In this case, the fail high-speed shift pattern is made to be the shift pattern shown in the aforesaid FIG. 3(C), and the fail low-speed shift pattern is made to be the shift pattern wherein the shift points are set further lower as shown in the aforesaid FIG. 3(D). With this arrangement, when the driver need not the power characteristics, the running can be performed in maximum consideration of the durability of the frictionally engaging devices.

Figure 6:
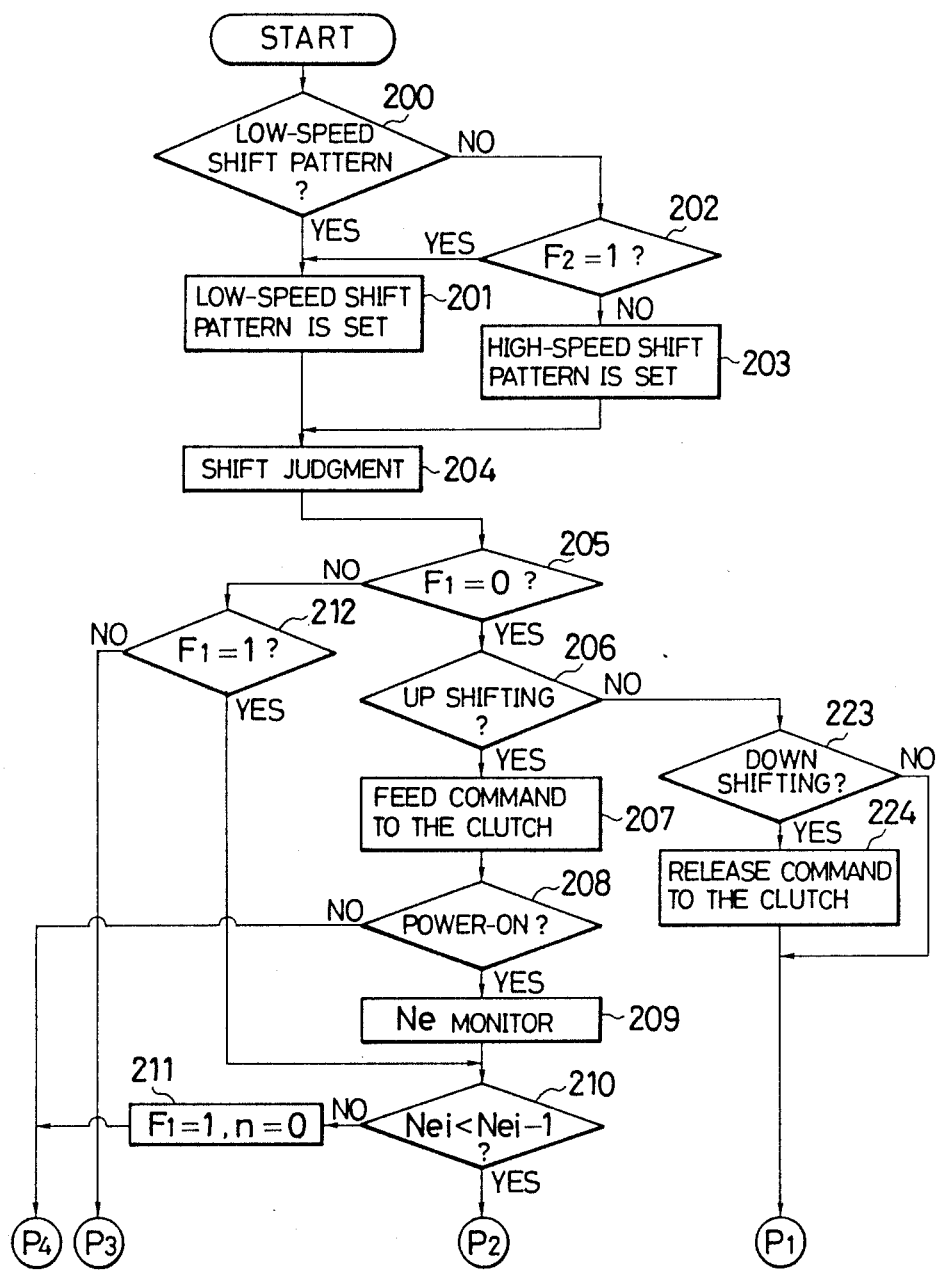
FIG. 6 is a flow chart showing a control routine illustrating a third embodiment of the present invention.

FIG. 6 is a flow chart showing another embodiment of the present invention.

In this second embodiment, the engine rotary speed Ne is also monitored to judge an abnormal shiftin by detecting the time duration, during which the engine rotary speed Ne is lowered.

Respective Steps will hereunder be described.

Step 200: judgment is made as to whether or not the low-speed shift pattern (Refer to the aforesaid FIG. 3(A)) wherein a shifting is performed within a low rotary region of the engine 1 is selected by the pattern select switch 17.

Step 201: when the result of judgment in Step 200 is "YES", the low-speed shift pattern is set as has been selected by the pattern select switch 17.

Step 202: when the low-speed shift pattern is not selected ("NO" in Step 200), judgment is made as to whether or not flag F2 is 1. Flag F2 comes to be 1 when an abnormal shifting is judged in Step 120. In the case where F2=1, i.e. an abnormal shifting actually occurred, even when a shift pattern other than the low-speed shift pattern, e.g. the high-speed shift pattern (Refer to the aforesaid FIG. 3(B)) is selected, the routine preceeds to Step 201 to set the low-speed shift pattern.

Step 203: when the low-speed shift pattern is not selected and flag F2 is not 1, the high-speed shift pattern is set.

Step 204: a shift judgment is performed in accordance with the shift pattern set in Step 201 or 203.

Step 105 and henceforth are identical with those in the embodiment shown in FIG. 2, so that the same reference numbers are given to the same Steps and doubled description will be avoided.

According to the above embodiment, the abnormal shifting is also detected by a time length of the shift time duration t and even if a shift pattern, wherein shift points are set slightly high, is selected by the pattern select switch, this shift pattern is forcedly changed to a shift pattern, wherein shift points are set slightly low, whereby shifts are performed in a region, where the inertia torque of the engine is low, after the succeeding shifting, whereby the heat load of the frictionally engaging devices is reduced during shifting, so that the durability of the frictionally engaging devices can be improved, the shift time duration t is shortened and high shift shocks can be avoided.

Additionally, according to this embodiment, even if, when an abnormal shifting is detected, a shift pattern set slightly high is selected by the pattern select switch, the shift pattern is changeds to a shift pattern set further slightly lower. As a consequence, to state theoretically, when the shift pattern, wherein the shift points are set slightly low, is originally selected by the pattern select switch, no particular function is performed. However, when the reality is taken into consideration, in the shift pattern wherein the shift points are set slightly low, the heat load of the frictionally engaging devices is originally not so high, so that the shifting is hardly prolonged to a time after the stroke-end of the accumulator piston. As a consequence, there seems no trouble in practice. According to this embodiment, there is no need of previously preparing a shift map separately set for the emergency use, i.e., the shift maps shown in FIGS. 3(A) and 3(B) suffice, so that such an advantage can be obtained in practice that there is little cost increase.

Figure 7:
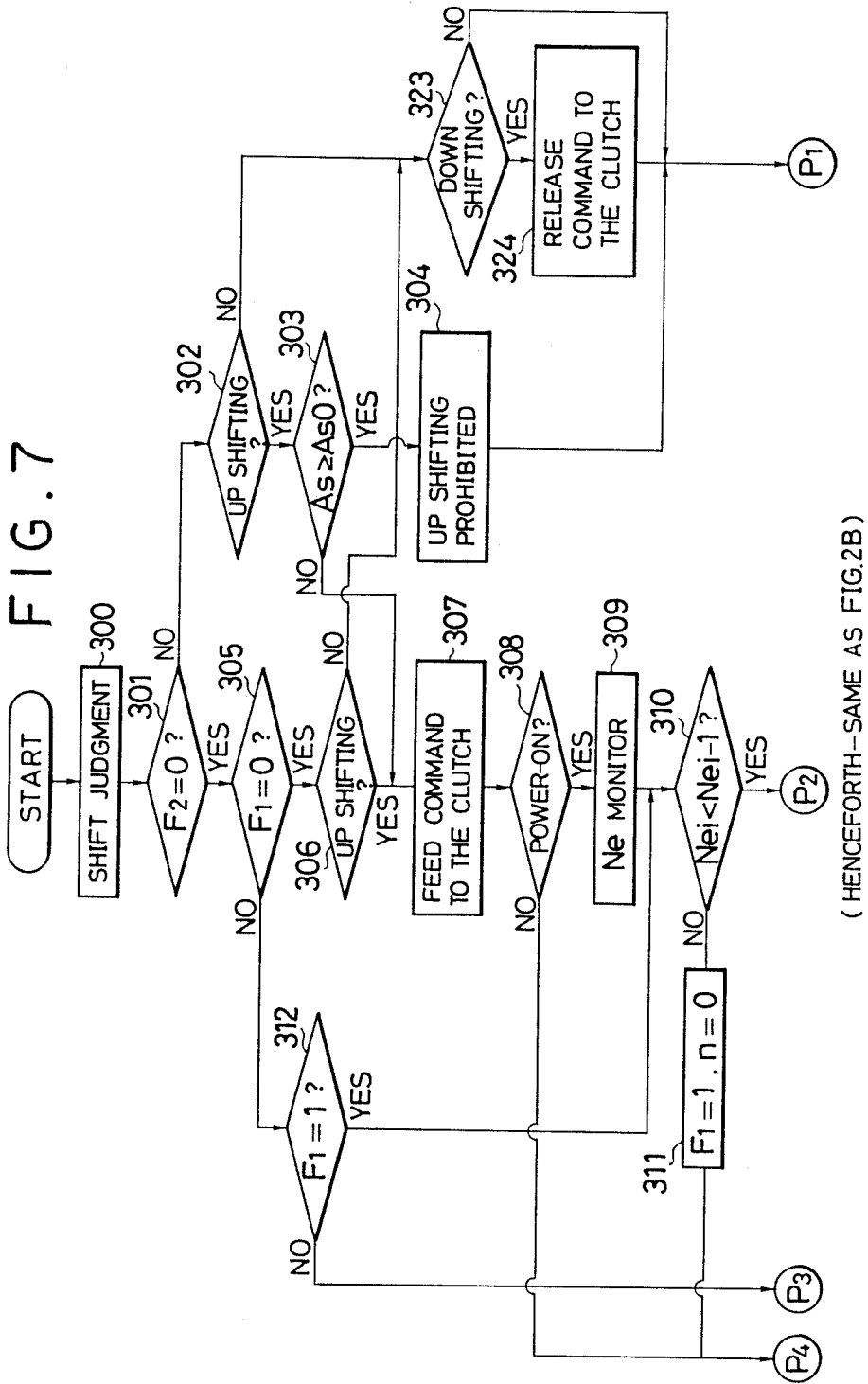
FIG. 7 is a flow chart showing a control routine illustrating a fourth embodiment of the present invention.

FIG. 7 is a flow chart showing a still further embodiment.

According to this embodiment, the engine rotary speed Ne is nomitored and a time duration, during which the engine rotary speed Ne is lowered, is detected, to thereby judge an abnormal shifting. Furthermore, the throttle opening (engine load) is adopted as a parameter to restrict the upshift.

Respectives Steps will hereunder be described.

Step 300: a shift judgment is performed in accordance with the vehicle speed and the throttle opening.

Step 301: by an abnormal shift discriminating Stgep 120, discrimination is made as to whether or not an abnormal shifting is judged. When the abnormal shifting is judged, i.e., $F2 \neq 0$, the routine proceeds to Step 302.

Step 302: judgment is made as to whether or not the upshift judgment is made. When there is no upshift judgment, the routine proceeds to Step 123 to discriminate whether the downshift judgment is made. When the upshift judgment is made, the routine proceeds to Step 303 to judge whether or not it is the region where the upshift is restricted.

Step 303: judgment is made as to whether or not a throttle opening As is equal to or larger than a predetermined value AsO. When As is equal to or larger than AsO, the routine proceeds to Step 304 to prohibit the upshift. When As is smaller than AsO, the routine proceeds to Step 107 to carry out a normal upshift.

Figure 8:
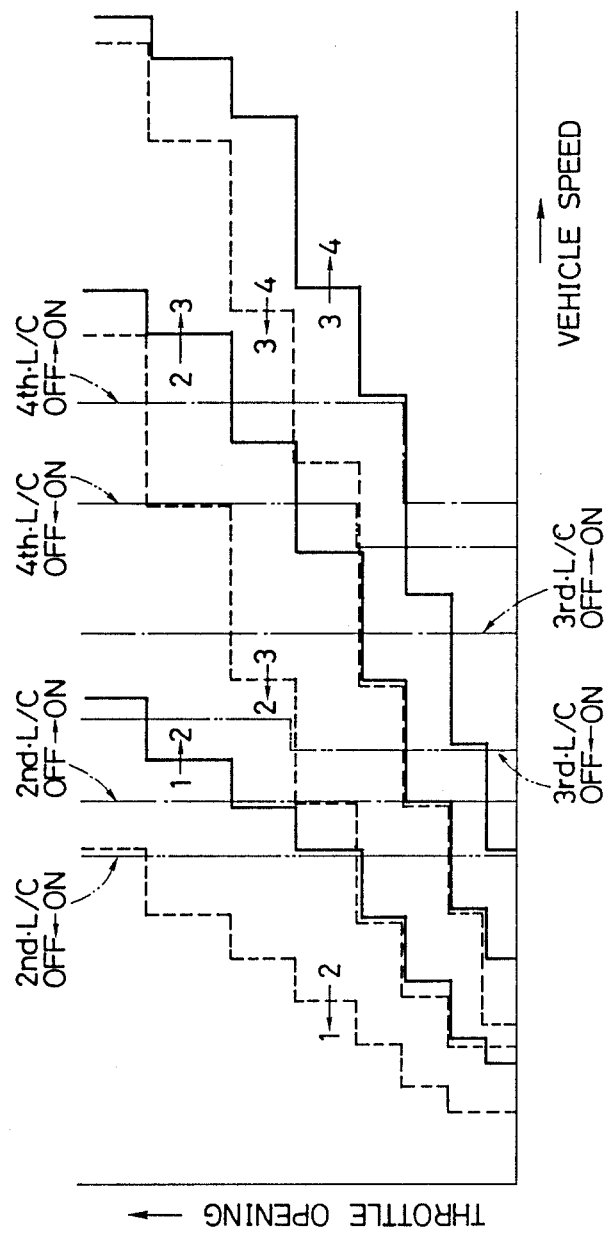
FIGS. 8 and 9 are charts showing examples of the shift patterns.
Figure 9:
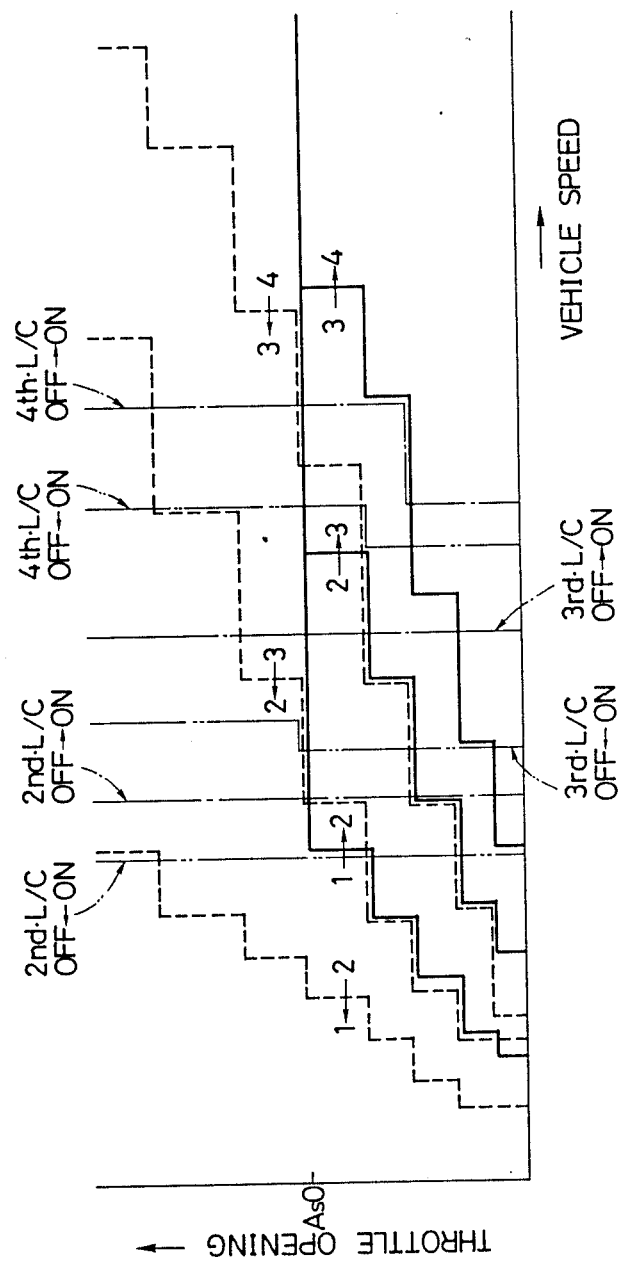

This control is just like one in which the shift pattern as shown in FIG. 8 during the normal time is changed over to the shift pattern as shown in FIG. 9, when the abnormal shifting is judged. More specifically, only the upshift under $As \geq A0$ is prohibited, however, the kickdown has the same setting as the one during the normal time, whereby the force of acceleration (driving force) in emergency is secured. In a consequence, the engine rotary speed can be used up to the maximum rotary speed, so that the driving force requested by the driver can be obtained. In this case, unless the accelerator is returned, the upshift cannot be performed. However, when the accelerator is returned and the throttle opening As is made smaller than AsO, the upshift can be performed.

Preferably, this predetermined value AsO may be set at the lower limit of the throttle opening, where the engine torque change control is carried out during the normal time. By setting As at the above-described value, when this control (FIG. 7) is carried out at the time of the abnormal shifting, the shifting under $As \leq AsO$ has the same engine output and shift points as the ones during the normal time, so that the shift characteristics completely equal to the one during the normal time can be obtained. However, for example, when the lower limit of the throttle opening, where the engine torque change control is carried out, is very low, if AsO is set at such a low value, the upshift can be performed only at a very low throttle opening, so that a considerable trouble occurs in practice. Accordingly, when the lower limit of the throttle opening, where the engine torque change control is carried out is very low, it is desirable to set AsO to the throttle opening as high as possible, at which the absorbed energy value of the frictionally engaging devices from the viewpoint of durability thereof can be assured and the shift shocks are tolerable, even if the engine output is not lowered.

In FIG. 9, there is adopted an example wherein AsO=50% from the above-described viewpoint, and FIG. 9 is a shifting chart, in which there is no trouble in practice at the time of abnormal shifting (the abnormality is not much felt by the driver.)

Step 304: the upshift of $As \geq AsO$ is prohibited during judgment of an abnormal shifting (F2=1).

Step 305: judgment is made as to whether or not flag F1 (during monitoring of the engine rotary speed) is zero, and, when "zero" is set, the routine proceeds to Step 306.

Step 306: judgment is made as to whether or not an upshift judgment is made.

Step 307: a command (shift command) is given to the electromagnetic valves S1–S3 to feed oil pressure to the corresponding frictionally engaging devices.

Step 308: judgment is made as to whether or not power-ON, i.e., engine output is positive.

Step 109 and henceforth are identical with those in the embodiment shown in FIG. 2, so that the same reference numbers are given to the same Steps and doubled description will be avoided.

According to this embodiment, an abnormal shifting is detected by a time length of the shift time duration t, and the upshift in the case where the throttle opening As is equal to or larger than AsO is restricted (prohibited), whereby only the downshift and the upshift performed in a region where the engine inertia torque is low can be performed, so that the durability of the frictionally engaging devices can be secured and high shift shocks can be prevented from occurring.

Furthermore, when the upshift is restricted, the driver is informed of the situation by the warning device, so that lead to discredit of the driver by the prohibition of the upshift can be avoided and the driver's attention can be called to quick inspection of the cause of the abnormal shifting.

Figure 10:
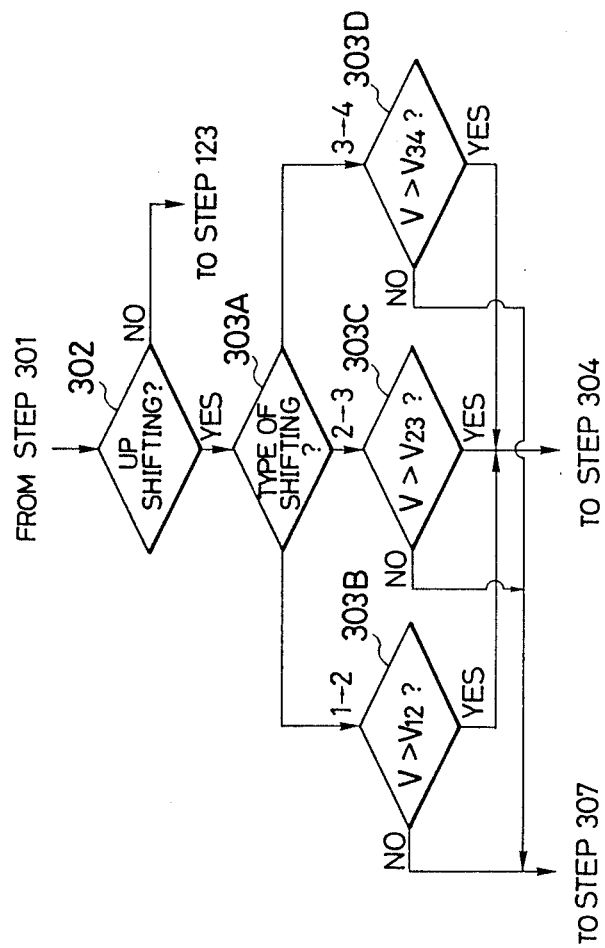
FIG. 10 is a flow chart showing a fifth embodiment of the present invention.

FIG. 10 is a flow chart of a still further embodiment wherein an upshift is restricted in association with the vehicle speed. Since this embodiment differes from the preceding embodiment only in Step 303, only this part is extracted for explanation.

Step 303A: judgment is made as to what the type of shifting of the upshift is. When the types of shifting are 1→2, 2→3 or 3→4, the routine proceeds to Step 103B, 103C or 103D, respectively.

Step 103B: judgment is made as to whther or not the vehicle speed V is larger than the shiftable upper limit vehicle speed V12 during 1→2 upshift. Additionally, this judgment by the vehicle speed is identical in meaning with the judgment by the output shaft rotary speed of the automatic transmission. When V>V12, the routine proceeds to Step 104 to prohibit 1→2 upshift, and, when V≦V12, the routine proceeds to Step 107.

Step 103C and 103D: in connection with 2→3 or 3→4 upshift, the operation similar to that in Step 103B is performed respectively.

As a result, the shifting having the shift pattern as shown in FIG. 8 during the normal time can be changed to the shift pattern shown in FIG. 11 when judged as an abnormal shifting. The substantial shift points in the shift pattern shown in FIG. 11 are identical with the one shown in FIG. 9. As described above, restriction of the upshift at the time of abnormal shifting can be carried out in association with the vehicle speed. The effect thus achieved is identical with that in the preceding embodiment shown in FIG. 7.

What is claimed is:

1. A system for shift control in an automatic transmission, wherein gear stages are automatically switched in accordance with a preset shift pattern, comprising:
    means for determining whether detected shifting data deviates from predetermined shifting data thereby determining whether a shifting was abnormal; and
    means for changing said shift pattern in the subsequent shifting to a fail shift pattern, wherein shift points are set slightly lower when said shifting was determined abnormal.

2. A system for shift control as set forth in claim 1, further comprising:
    means for detecting an engine rotary speed; and
    means for detecting a time duration of an engine rotary speed change from a first rotary speed to a second rotary speed;
    wherein said means for determining whether a shifting was abnormal determines whether the time duration of said engine rotary speed change exceeds a preset value.

3. A system for shift control as set forth in claim 2, further comprising:
    means for detecting at least one of an engine load and a type of shifting;
    wherein said preset value is changed in accordance with at least one of the engine load and the type of shifting.

4. A system for shift control as set forth in claim 1, further comprising:
    means for detecting an output shaft torque of the automatic transmission; and
    means for detecting a time duration of an output shaft torque change from a minimum torque value to a maximum torque value;
    wherein said means for determining whether a shifting was abnormal compares the time duration of said output shaft torque change with a preset value.

5. A system for shift control as set forth in claim 4, further comprising:
    means for detecting at least one of an engine load and a type of shifting;
    wherein said preset value is changed in accordance with at least one of the engine load and the type of shifting.

6. A system for shift control as set forth in claim 1, further comprising:
    means for detecting an output shaft torque of the automatic transmission;
    wherein said means for judging the abnormality discriminates whether the maximum value or the minimum value of the output shaft torque deviate from respective preset values.

7. A system for shift control as set forth in claim 6, further comprising:
    means for detecting at least one of an engine load and a type of shifting;
    wherein said preset value is changed in accordance with at least one of the engine load and the type of shifting.

8. A system for shift control as set forth in claim 1, further comprising:
    means for issuing a warning;
    wherein said warning is issued when said shift changed.

9. A system for shift control as set forth in claim 1, further comprising:
    means for detecting an engine load;
    wherein a change to said fail shift pattern is carried out only when said engine load is larger than a predetermined value.

10. A system for shift control as set forth in claim 1, further comprising:
    means for detecting the type of shifting during which said means for determining has determined that a shifting was abnormal;
    wherein a change to said fail shift pattern is carried out only for the shifting which has had the abnormality.

11. A system for shift control as set forth in claim 1, further comprising:
    means for carrying out an engine torque change during shifting;
    wherein said fail shift pattern is formed of shift points previously searched such that an absorbed energy value of the frictionally engaging devices can be less than a tolerance value when an engine torque lowering control operation, which should be performed during shifting, is not carried out.

12. A system for shift control as set forth in claim 1, further comprising:
    pattern select means capable of selecting one of a plurality of preset shift patterns;
    wherein said fail shift patterns are provided in plural number in accordance with the state of selection.

13. A system for shift control as set forth in claim 1, wherein, in the fail shift pattern, shift points for downshift are set still lower against shift points for upshifts as compared with normal balancing between upshift points and downshift points.

14. A system for shift control as set forth in claim 1, further comprising:
    pattern select means capable of selecting one of a plurality of preset shift patterns;
    wherein the fail shift pattern is made identical with a shift pattern, in which the shift points are set slightly low, out of the shift patterns provided in plural number.

15. A system for shift control in an automatic transmission, wherein gear stages are automatically switched in accordance with a preset shift pattern, comprising:
    means for determining whether detected shifting data deviates from predetermined shifting data thereby determining whether a shifting was abnormal;
    means for restricting a performing region of the subsequent upshift when said shifting was determined abnormal.

16. A system for shift control as set forth in claim 15, further comprising:

means for detecting an engine rotary speed; and means for detecting a time duration of an engine rotary speed change from a first rotary speed to a second rotary speed;

wherein said means for determining whether a shifting was abnormal compares the time duration of said engine rotary speed change with a preset value.

17. A system for shift control as set forth in claim 16, further comprising:

means for detecting at least one of an engine load and a type of shifting;

wherein said preset value is changed in accordance with at least one of the engine load and the type of shifting.

18. A system for shift control as set forth in claim 15, further comprising:

means for detecting an output shaft torque of the automatic transmission; and means for detecting a time duration of an output shaft torque change from a minimum torque vlaue to a maximum torque value:

wherein said means for determining whether a shifting was abnormal compares the time duration of said output shaft torque change with a preset value.

19. A system for shift control as set forth in claim 18, further comprising:

means for detecting at least one of an engine load and a type of shifting;

wherein said preset alue is changed in accordance with at least one of the engine load and the type of shifting.

20. A system for shift control as set forth in claim 15, further comprising:

means for detecting an output shaft torque of the automatic transmission;

wherein said means for juding the abnormality discriminates whether the maximum value or the minimum value of the output shaft torque deviate from respective preset values.

21. A system for shift control as set forth in claim 20, further comprising:

means for detecting at least one of an engine load and a type of shifting;

wherein said preset value is changed in accordance with at least one of the engine load and the type of shifting.

22. A system for shift control as set forth in claim 15, further comprising:

means for issuing a warning;

wherein said warning is issued when a performing region of the upshift is restricted.

23. A system for shift control as set forth in claim 15, further comprising:

means for detecting an engine load;

wherein said performing region of the upshift is restricted to a predetermined range of values of the engine load.

24. A system for shift control as set forth in claim 15, further comprising:

means for detecting a vehicle speed;

wherein said performing region of the upshift is restricted to a predetermined range of values of the vehicle speed.

25. A system for shift control as set forth in claim 24, further comprising:

means for detecting a type of shifting;

wherein the value of vehicle speed for restricting said performing region of the upshift is changed in accordance with the type of shifting.

26. A system for shift control as set forth in claim 15, wherein, even when said performing region of the upshift is restricted, downshift is carried out as though no deviations from the predetermined shifting data have been detected.

* * * * *